United States Patent [19]

Jeram

[11] 4,041,010
[45] Aug. 9, 1977

[54] SOLVENT RESISTANT ROOM TEMPERATURE VULCANIZABLE SILICONE RUBBER COMPOSITIONS

[75] Inventor: Edward M. Jeram, Burnt Hills, N.Y.

[73] Assignee: General Electric Company, Waterford, N.Y.

[21] Appl. No.: 619,592

[22] Filed: Oct. 6, 1975

[51] Int. Cl.$^2$ .................. C08L 83/06; C08K 3/10; C08G 77/12
[52] U.S. Cl. .................. 260/42.26; 260/37 SB; 260/46.5 G; 260/825
[58] Field of Search .................. 260/825, 37 SB, 42.26

[56] References Cited

U.S. PATENT DOCUMENTS 3,436,636   4/1969   Modic .................. 260/825
3,607,832   9/1971   Hansen .................. 260/825

*Primary Examiner*—Wilbert J. Briggs, Sr.
*Attorney, Agent, or Firm*—John L. Young; E. Philip Koltos; Frank L. Neuhauser

[57] ABSTRACT

A solvent resistant silicone rubber room temperature vulcanizable silicone rubber composition is provided for by having a blend to a vinyl-containing polymer and a vinyl-containing silicone resin and as a cross-linking agent a hydride-containing resin or a hydrogen containing polysiloxane. The composition has therein, also, a platinum catalyst. There may also be present in the composition a filler which may be an extending filler or a reinforcing filler, treated or untreated as may be desired.

18 Claims, No Drawings

SOLVENT RESISTANT ROOM TEMPERATURE VULCANIZABLE SILICONE RUBBER COMPOSITIONS

BACKGROUND OF THE INVENTION

The present invention relates to solvent resistant room temperature vulcanizable silicone rubber compositions and more particularly the present invention relates to a room temperature vulcanizable silicone rubber composition having fluorinated substituent groups in the polymers which are cured in the presence of a platinum catalyst to result in a solvent resistant elastomer.

Silicone elastomers are well known in the art and are desired for many applications in which high and low temperature stability are desired.

It is also known that silicone elastomers whether room temperature vulcanizable silicone elastomers or heat vulcanizable silicone elastomers have a certain amount of resistance to solvent degradation from hydrocarbon fluids. However, in certain applications, the solvent resistance to hydrocarbon fluids of traditional silicone elastomers has not been great enough. Accordingly, in an attempt to solve this problem, fluorinated substituted heat vulcanizable silicone rubber compositions were devised. See, for instance, the disclosure of U.S. Pat. Nos. 2,979,519 of Pierce et al and 3,179,619 of Brown. Such heat vulcanizable fluorinated substituted silicone rubber compositions as disclosed in the above patents have solvent resistance and the resulting elastomer has good physical properties for many applications.

However, one disadvantage of such heat vulcanizable silicone rubber compositions was that to obtain sufficient strength in the cured elastomer it was necessary to incorporate into it large amounts of filler and high molecular weight siloxane gums. Thus, the uncured composition of such heat vulcanizable silicone rubber compositions usually had a viscosity in the neighborhood of 50,000,000 centipoise and above at 25° C. Accordingly, such a viscous, uncured composition is difficult to process and time consuming to produce fabricated parts from it such as, electrical connectors. This problem appears to be unresolvable with such compositions since the base diorganopolysiloxane gums that are useful to prepare such heat vulcanizable silicone rubber compositions have a viscosity of anywhere from 1,000,000 to 200,000,000 centipoise at 25° C. Accordingly, the resulting viscosity of the silica and gum mixture is bound to be at the level of 50,000,000 centipoise and above.

To solve this problem, some attempts have been made to produce a one-part room temperature vulcanizable silicone rubber composition. However, such compositions as is well known in the art have to be kept in an anhydrous state prior to cure. Accordingly, such compositions which have to be kept in an anhydrous state are also very difficult to process.

It was quite unexpected, therefore, that an SiH-olefin platinum catalyzed silicone rubber composition could be prepared having fluorinated substituent radicals such that the composition has the proper solvent resistance to hydrocarbon fluids, good physical properties and a fast cure rate at elevated temperatures. Such composition is, for instance, that disclosed in the copending application of Edward M. Jeram, Docket No. 60SI-51, filed on the same date as the present application entitled "Solvent Resistant Room Temperature Vulcanizable Silicone Rubber Compositions". However, the difficulty in such a composition is that it is desirable to incorporate fillers and specifically treated reinforcing fillers in the uncured composition so that the cured elastomer would have optimum physical properties. As a result, the viscosity of the uncured composition would be in the neighborhood of 4 to 6,000,000 centipoise at 25° C, depending on how much filler was incorporated into the uncured composition.

Accordingly, it is desirable to have such an SiH-olefin platinum catalyzed silicone rubber composition which in the uncured state has substantially lower viscosity and in which various fillers may be incorporated into it, both extending and/or reinforcing fillers, without unduly increasing the viscosity of the final uncured composition.

It is one object of the present invention to provide for an SiH-olefin platinum catalyzed room temperature vulcanizable silicone rubber composition which has a very low viscosity in the uncured state and which in the cured state is solvent resistant, and which cures rapidly with no by-products when heated.

It is an additional object of the present invention to provide for an SiH-olefin platinum catalyzed silicone rubber composition which in the cured state has physical properties approaching or comparable to that of heat vulcanizable silicone rubber compositions but which does not necessitate the use of a filler.

It is yet an additional object of the present invention to provide for an SiH-olefin platinum catalyzed silicone rubber composition in which any type of filler may be incorporated into it such that the composition maintains its low viscosity in the uncured state and which in the cured state has desirable physical properties and is solvent resistant.

It is still another object of the present invention to provide a simple and economical process for preparing a solvent resistant SiH-olefin platinum catalyzed silicone rubber composition which has physical properties nearly comparable to that of heat vulcanizable silicone rubber compositions.

These and other objects of the present invention are accomplished by means of the disclosure set forth herein below.

SUMMARY OF THE INVENTION

In accordance with the above objects, there is provided by the present invention a solvent resistant room temperature vulcanizable silicone rubber composition comprising (A) 100 parts of a mixture composed of (i) 100 parts of a vinyl-containing polymer of the formula,

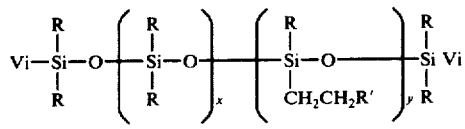

(1)

where Vi is vinyl, R is selected from the class consisting of alkyl radicals of 1 to 8 carbon atoms and phenyl, R' is perfluoroalkyl of 1 to 8 carbon atoms, x and y are at least 1 and the viscosity of the compound varies from 1,000 to 500,000 centipoise at 25° C, and the concentration of siloxy units taken y times varies from 5 to 98 mole percent; (ii) from 1 to 60 parts of a vinyl-containing resin selected from the class consisting of a resin having ViRR″SiO$_{0.5}$ units and SiO$_2$ units where the hydrocarbon substituent to Si ratio varies from 0.8 to 2.7; a resin having ViRR″SiO$_{0.5}$ units, SiO$_2$ units and RR″SiO units where the hydrocarbon substituent to Si ratio varies from 0.8 to 2.4; a resin having ViR$_2$SiO$_{0.5}$ units, R$_2$R″SiO$_{0.5}$ units, SiO$_2$ units and RR″SiO units where the hydrocarbon substituent to Si ratio varies from 0.8 to 2.4; a resin having ViR$_2$SiO$_{0.5}$ units, R$_2$R″SiO$_{0.5}$ units, SiO$_2$ units, ViR″SiO units and RR″SiO units where the hydrocarbon substituent to Si ratio varies from 0.8 to 2.4, and a resin having R$_2$R″SiO$_{0.5}$ units, SiO$_2$ units and ViR″SiO units where the hydrocarbon substituent to Si ratio varies from 0.8 to 2.4, where Vi and R are as previously defined, R″ is selected from the class consisting of alkyl radicals of 1 to 8 carbon atoms, phenyl radicals and —CH$_2$CH$_2$R′ radicals, where R′ is as previously defined and the vinyl concentration of said resin must not differ more than 20 mole percent from the vinyl concentration of polymer (i); (iii) from 0.1 to 50 parts per million of the total composition of a platinum catalyst; and (B) from 1 to 50 parts based on 100 parts of the mixture of (A) of a cross-linking polymer selected from the class consisting of (iv) a resin having

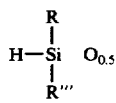

and SiO$_2$ units where the R + R‴ + H to Si ratio varies from 1.0 to 2.7; (v) a resin having

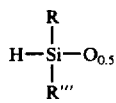

units, SiO$_2$ units RR‴SiO units where the R + R‴ + H to Si ratio varies from 1.2 to 2.7 and (vi) a polymer of the formula

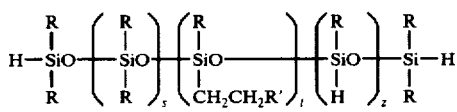

(2)

and mixtures thereof and where the concentration of the units taken $t$ times varies from 0 to 75 mole percent where R, R′ are as previously defined, $s$ is at least 1, $t$ and $z$ may be zero or a positive integer and the viscosity of the polymer varies from 10 to 1000 centipoise at 25° C, and R‴ is selected from the class consisting of alkyl radicals of 1 to 8 carbon atoms and —CH$_2$CH$_2$R′ radicals.

The above composition will have good physical properties even in the absence of a filler and have the required solvent resistance. However, if it is desired to maximize physical properties, then from 5 to 100 parts by weight based on the blend of the vinyl-containing polymer (i) above and the vinyl-containing resin based on the mixture there may be used 5 to 100 parts of any of the well known reinforcing and extending fillers, treated or untreated.

The platinum catalyst may be any of the well known platinum catalysts disclosed in the art and may be a simple type of catalyst such as, platinum metal deposit on a solid carrier such as, charcoal or gamma-alumina or may be platinum in the form of a soluble platinum complex. Accordingly, one catalyst which will be described below and which is preferred in the present application is the platinum complex of platinum with a vinyl-containing polysiloxane. In addition, if desired a cure inhibitor may be incorporated into the composition to extend the work life of the composition at room temperature.

The composition is simply cured by mixing the hydride cross-linking agent into mixture (A) and allowing the composition to cure either at room temperature or, if desired, at elevated temperatures whereupon at elevated temperatures, that is, above 100° C, the composition cures to an elastomer in an extremely short period of time.

The composition as manufactured and prior to use is formed in two components where the base vinyl-containing polymers, resin, fillers and platinum catalysts are prepared in one-component or package and the hydride cross-linking agent is prepared in the second component or package. When the end user decides to utilize the composition to fabricate various parts, he simply mixes the two components together in the above concentrations and allows the resulting composition to cure.

It can be appreciated that portions of the vinyl-containing resin and the vinyl-containing polymer as well as the filler, may be incorporated into the second component with the hydride cross-linking agent, as desired, without detracting from the usability of the composition or from the final physical properties of the composition. It is only necessary in forming the two components that the platinum catalyst is inserted in the first component, that is, along with the vinyl-containing polymer and the vinyl-containing resin.

DESCRIPTION OF THE PREFERRED EMBODIMENT

In the formula of the polymer of Formula (1) above, R is generally selected from alkyl radicals of 1 to 8 carbon atoms and phenyl radicals. Preferably, it is an alkyl radical of 1 to 3 carbon atoms such as, methyl, ethyl, propyl, R′ is a perfluoroalkyl radical of 1 to 8 carbon atoms, as stated previously, and is most preferably CF$_3$, and $x$ may vary from 1 to 1000 and $y$ may vary from 1 to 1000. It is only necessary that $x$ be at least 1 and $y$ at least 1, and such that the viscosity of the final polymer may vary from 1000 to 500,000 centipoise at 25° C, and preferably varies from 1000 to 100,000 centipoise at 25° C. In the polymer the concentration of the units taken $y$ times may vary anywhere from 5 to 98 mole percent in the total polymer and preferably the concentration of the siloxy units taken $y$ times varies from 30 to 98 mole percent. These polymers may be made by a variety of ways, preferably, they are made by the process set forth in the copending case of John S. Razzano, Ser. No. 574,332, filed May 5, 1975 entitled "Diorganopolysiloxane Copolymers and Process for the Preparation Thereof". Generally the process comprises reacting octaalkylcyclictetrasiloxanes with alkyl perfluoromethylethylenetetracyclicpolysiloxanes at temperatures between 0° - 90° C in the presence of a catalyst which is preferably, cesium hydroxide or potassium or sodium silanolates as disclosed in the above referred to application of John S. Razzano.

To control the viscosity of the final polymer such that it has the desired end viscosity there is incorporated into the equilibration mixture chain-stoppers which are disiloxanes or trisiloxanes or low molecular weight linear polysiloxanes which have terminal vinyl-containing siloxy units. The resulting mixture is equilibrated at the temperatures specified above for a sufficient period of time such that the equilibration is reached and as much of the cyclicsiloxanes are being converted to the desired polymer as there is of the desired polymer breaking up and being reconverted into the cyclicsiloxanes. At equilibration, there is at least 50 percent conversion of the cyclicsiloxanes to the linear polymer. At the point the catalyst is neutralized and the cyclicsiloxanes are stripped off and the desired polymer of Formula (1) is obtained.

Another method of producing such a polymer is to react the cyclic trimers to the above Pierce et al patent, U.S. Pat. No. 2,979,519 and reacting the fluorinated trimers of that patent with cyclicalkyl and phenyl-containing tetramers with the necessary chain-stoppers at elevated temperatures and in the presence of even a wider variety of alkali metal catalysts than the ones disclosed above in the foregoing Razzano process. Although either process may be utilized, the Razzano process is preferred in the present case since it results in copolymers being obtained through a broader range of concentrations as compared to the case where the fluorinated cyclic trimer is utilized in the above-described process.

To 100 parts of this vinyl-containing polymer there may be added from 1 to 60 parts of the vinyl-containing resin. The resin must have vinyl units in it and must be one of the resins specified above. It is only necessary that the fluoroalkylalkylene content of the resin not differ by more than 20 mole percent from the vinyl content of the polymer of Formula (1) if the two are to be compatible with each other which is necessary criteria in forming the compositions of the present invention.

The above resins may be prepared under one method by reacting a silica hydrosol with the appropriate chlorosilanes or alkoxylated silanes. The silica hydrosols employed are prepared in the usual manner by neutralizing sodium silica solutions. This neutralization may be carried out either by employing an acid or a chlorosilane. In the latter case, it is not necessary to add any additional acid to the reaction mixture. Whereas the silica sol at any concentration would react with the above defined organosilicon compounds under acid conditions, it is preferred that the sol have a concentration of from 1 to 35 percent by weight of $SiO_2$.

The silanes and siloxanes may be employed individually or in a mixture. In such cases, the chlorosilane may be added directly to the sodium silicate solution. It is necessary at this point to add a lower alcohol such as isopropanol to stabilize the mixture. In the case where alkoxysilanes are employed, it is necessary that the silica hydrosol contain sufficient acid so that the pH of the reaction mixture will be less than five. Suitable acids are phosphoric, benzenesulfonic, trichloroacetic or any other type of weak acid. Any amount of excess acid other than that which is necessary to lower the pH below 5 may be employed.

Any of a large group of compounds within the above formulas may be used to prepare this silicone resin. Specific examples of individual compounds which are satisfactory are vinyldimethylchlorosilane, vinyldimethylethoxysilane, divinyl trifluoropropylisopropoxysilane, phenyldimethylchlorosilane, divinyltetramethyldisiloxane, polydimethylsiloxane, divinyltetraethyldisiloxane, vinylmethyldichlorosilane, methyltriethoxysilane, trifluoropropyldimethylchlorosilane, and trifluoropropylmethyldichlorosilane.

The silica hydrosol is simply mixed with the silanes and/or siloxanes to form the required silicone resin. As mentioned previously, a weak acid is added to lower the pH to below 5 if a chlorosilane is not involved in the reaction. It has been found that the reactions between silica hydrosol, silanes and/or siloxanes proceeds rapidly at 30° C or above to produce the copolymeric siloxanes. During the reaction, the mixture is preferably thoroughly agitated. In general, an emulsion forms which separates into two layers upon standing. The layers are then separated and the organosilicon layer is stripped or washed free of acid. The resin is then produced by the procedure described below.

More specific details as to this process can be found in Daudt et al, U.S. Pat. No. 2,676,182.

Another method for forming the desired resin of the present invention is by the controlled hydrolysis of compounds such as the ones having the formula $ViR_{n}SiX_{3-n}$, $R''R_{n}SiX_{3-n}$ and $ViR''_{n}SiX_{3-n}$ where Vi, R and R'' are as previously defined, X represents a halogen atom and n may vary from 1 to 2. The above halogen compounds were reacted with ethyl orthosilicate to provide the desired resins. A solution of the halogensilane in an inert non-alcoholic organic solvent is formed in which the organic solvent is insoluble or substantially insoluble in water and is selected from the class consisting of (1) aliphatic and aromatic liquid hydrocarbons, and (2) liquid ethers containing at least 4 carbon atoms. This solution is gradually added to a two-phase hydrolyzing medium comprising a mixture of water in an amount considerably in excess of that calculated as having to hydrolyze the silane and a liquid aliphatic alcohol which is not completely soluble in water but which dissolves an appreciable amount of water.

Alcohols that are suitable are lower primary alcohols such as, ethanol and propanol. In addition, solvents such as, butyl acetate and ethyl acetate can be utilized which are the preferred non-alcoholic solvents for the silane derivatives and any type of ketone solvent such as acetone and various chlorinated hydrocarbon solvents.

The halosilanes and orthosilicate are dissolved in the solvent and then water is added. The mixture is vigorously stirred during the reaction which is exothermic. After the reaction has proceeded to completion, the agitation is discontinued and the reaction mixture allowed to separate into two layers. The lower aqueous layer is removed and the organic layer is stripped to reduce the acid. To the resin solution there is added solvent as is necessary and 100 to 1000 parts per million of an alkali metal hydroxide such as, potassium hydroxide. The resulting mixture is heated to from 50° C to 200° C for 2 to 4 hours such that the silanol content of the resin is lowered to below 0.5 weight percent. The alkali metal hydroxide is then neutralized and some of the solvent is stripped off to yield the desired resin in solution. Although it is not necessary to so body the vinyl-containing resins of the present composition it has been found the composition with the best physical properties are obtained where the silanol content of the resins are below 0.5 weight percent.

In addition to the vinyl content of the resin it is preferred that the resin contain some $—CH_2CH_2R'$ substituent groups where R' is as previously defined. Accordingly, in the formula of such resins, R'' is preferably selected from the class consisting of alkyl radicals of 1 to 8 carbon atoms and is preferably methyl, phenyl radicals or —$CH_2CH_2R'$ radicals. Preferably, the $(R)R'CH_2CH_2SiO$ mole percent siloxy content in the resin is the same as the concentration of such units in the polymer of Formula (1) and most preferably it is within 10–20 mole percent of the concentration of such units in the polymer of Formula (1). The use of such resins in the present formulation results in a cured elastomer composition which has good tensile strength and elongation properties even without silica filler which is utilized in the copending case of Edward M. Jeram, filed of even date referred to hereinabove.

The third ingredient in the composition in the present case which must be present is from 0.1 to 50 parts per million of the total composition of a platinum catalyst. The concentration given is in parts by weight of platinum present in the total composition. The platinum catalyst which may be utilized in the present composition may be platinum deposited on a solid carrier such as, platinum on charcoal or platinum on gamma-alumina or it may be a solubilized platinum complex. The solubilized platinum complex are preferred in the present composition since they are more reactive.

Preferred platinum catalysts are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexane, cycloheptane, etc.

A further platinum containing material usable in the composition of the present invention is the platinum chloride cyclopropane complex $(PtCl_2.C_3H_6)_2$ described in U.S. Pat. No. 3,159,662, Ashby.

Still, further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinylcyclotetrasiloxane in the presence of sodium bicarbonate in an ethanol solution.

The Karstedt or Lamoreaux catalysts are preferred in the present composition since they are the most reactive and result in the cure rate of the composition being most easily controlled. The Karstedt catalyst which is the most preferred is generally an alkenyl polysiloxane complexed with platinum and which is substantially free of chlorine radicals. Generally, when the composition is prepared the platinum catalyst is incorporated into the vinyl-containing resin and the vinyl-containing polysiloxane of Formula (1) as a separate first component. When it is desired to cure the composition, the first component or mixture (A) is taken and there is incorporated the hydride cross-linking agent of (B) to produce the cured silicone elastomer.

With respect to the cross-linking agent, that is, a hydride cross-linking agent as specified above, there is utilized from 1 to 50 parts of the hydride cross-linking agent per 100 parts of mixture (A), and more preferably there is utilized from 1 to 25 parts of a cross-linking agent per 100 parts of the mixture (A). It is desirable that the hydride cross-linking agent, whether it be a resin or the polymer of Formula (2), contain comparable concentrations of perfluorosilicone siloxy substituent groups at the concentration similar to that to be found in the vinyl-containing polymer of Formula (1) mixture (A). However, this is not necessary. If such hydride cross-linking agent is utilized its compatibility and the solvent resistance of the total cured elastomer is enhanced.

With respect to the hydride cross-linking resins such resins are prepared in much the same way as the vinyl containing resins specified above, except there is utilized as silane reactants hydride containing chlorosilanes and alkoxysilanes as discussed in the copending case of E. Jeram, Docket No. 60SI-51. Again, these hydride resins need not be bodied but cured compositions with better physical properties are obtained if the hydride resins have a silanol content below 0.5 weight percent. The preferred bodying method for the hydride resins is that described in the above copending case of E. Jeram.

The hydride containing polysiloxane polymers of Formula (2) are prepared in a similar way as the vinyl-containing polymer of Formula (1), except that an acid equilibration catalyst must be used such as, sulfuric acid, that is, by the equilibration of tetramers with sufficient chain-stoppers in the presence of sulfuric acid, such that the end viscosity of the polymer mixture varies from 10 to 1000 centipoise at 25° C.

An alternate procedure is to take the appropriate chlorosilanes including hydride dialkylchlorosilanes as chain-stoppers and simply hydrolyze the chlorosilanes in water and separate the resulting polymer from the hydrolyzate first removing the water and solvent and then stripping off any cyclics that may be formed in the hydrolysis.

The second procedure is desirable when it is desired to obtain the hydride polysiloxane polymer of Formula (2) at low viscosity, i.e., say at the level of 10 to 100 centipoise at 25° C.

Generally, in the polymer of Formula (2), $s$ may vary from 1 to 1000, $t$ may vary from 0 to 1000, but the sum these must be at least 1 and the symbols must be of such values that the final viscosity of the polymer varies from 10 to 1000 centipoise at 25° C, $z$ may be zero. However, $z$ may have a value of 1 and above if it is desired to include hydride units in the polymer chain. Again, $z$ may be any value along with the values of $s$ and $t$ such that the viscosity of the final polymer varies from 10 to 1000 centipoise at 25° C. Generally, the $(R)R'CH_2CH_2SiO$ units taken $t$ times varies at a concentration from 0 to 75 mole percent and preferably from 25 to 75 mole percent so as to give the final cured composition the maximum solvent resistance.

These are the basic ingredients of the present composition and the resulting composition in the uncured state will have viscosities varying anywhere from 2,000 to 100,000 centipoise at 25° C, and will have desirable physical properties even without the incorporation of a filler. However, a filler may be utilized. It is important to note that for reinforcing properties to be imparted to the composition it is not necessary to add a reinforcing filler such as, fumed silica and precipitated silica, whether treated or untreated. Specifically, there may be added from 5 to 100 parts in mixture (A) of a filler which is selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum, oxide, alpha quartz, calcined clay, asbestos, carbon, graphite, cork, cotton, synthetic fibers. Although fumed and precipitated silica may be advantageously incorporated into the composition, in some cases they may be undesirable since they may unduly increase the viscosity of the final uncured composition. Most of the fillers mentioned above are extended fillers and may be advantageously added to increase the final cured physical properties of the composition without unduly increasing the viscosity of the composition prior to cure. If it is desired to increase the physical properties of the composition, there may preferably be utilized fumed silica or precipitated silica that has been treated. Thus, the silica fillers may be treated as, for example, as disclosed in U.S. Pat. No. 2,938,009, Lucas, with cyclic-polysiloxanes, which disclosure of which patent is hereby incorporated by reference.

Another method for treating fillers or treated fillers that can be disclosed in Brown, U.S. Pat. No. 3,024,125, disclosure of which patent is also incorporated into the present case by reference.

More specifically, the silazane treated fillers in accordance with the disclosure of Smith, U.S. Pat. No. 3,635,743 and Beers, U.S. Pat. No. 3,847,848, can be utilized as treated fillers to be utilized in the composition of the present case.

Other well known additives which may be utilized in the composition of the present case are heat stabilizing agents, and cure inhibitors. For instance, there may be utilized in mixture (A) from 0.1 to 5 parts of iron oxide and preferably, red iron oxide which also acts as a pigment. The iron oxide's basic function is to act as a heat stabilizing agent. Other types of pigments may be utilized in the composition.

In addition, it can be appreciated that such SiHolefin platinum catalyzed compositions can cure at room temperature over prolonged periods of time such as 10 minutes to 12 hours or can cure at elevated temperatures in extremely short periods of time such that it can be measured in seconds. Examples of such temperature would be above 100° C.

To give the composition extended work life at room temperature there may be incorporated into the composition a cure inhibitor. Thus, there may be incorporated into mixture (A) from 100 to 10,000 parts per million of a cure inhibitor which may advantageously be an alkenyl containing cyclicpolysiloxane.

Examples of such cure inhibitors that may be utilized are methylvinyltetracyclicpolysiloxane, methylallyl-tricyclicpolysiloxane, ethylallyltetracyclicpolysiloxane. With such a cure inhibitor in the composition, the present composition may have a work life at room temperature of anywhere from 2 to 16 hours. The advantages of such a cure inhibitor in the composition is that it allows the composition to be worked and processed in its low viscosity state to fabricate various parts and to give sufficient time to act on the composition prior to cure. It should also be mentioned that although the composition was described above wherein the mixture (A) there was the vinyl-containing polymer, the vinyl-containing resin and the platinum catalyst to form a single first component and the second component was the hydride cross-linking agent, the composition may be formulated in various ways. For instance, there may be some of the vinyl-containing polymer of Formula (1) and the vinyl-containing resin as well as the filler mixed in with the hydride or the second component. It is only necessary that the platinum catalyst be packaged or prepared in the first component along with some of the vinyl-containing polymer and some of the vinyl-containing resin. The cure inhibitor and the stabilizing agent as well as other additives and pigments are also preferably mixed into the first component since it is the largest part of the mass as compared to the second component and facilitates mixing of the final composition.

To prepare the cured elastomer, the hydride cross-linking agent is mixed into mixture (A) thoroughly, and the composition is utilized to form various fabricated parts or as an encapsulating compound. Then the composition can be cured at room temperature over extended periods of time as has been explained above with the cure inhibitor in it. If for some reason the cure inhibitor is not desired then the composition can be cured at elevated temperatures in the matter of seconds. More preferably, the composition is cured at room temperature over an extended period of time with the cure inhibitor in the composition so as to allow the composition to be utilized to fabicate various parts therefrom such as, electrical connectors.

The examples below are given for the purpose of illustrating the invention and are not intended to define or limit the scope of the invention but are merely given for the purpose of exemplifying the manner of practicing the invention. All parts in the present specification are by weight.

EXAMPLE 1

There was prepared a first component (A) composed of 75 parts of a vinyl-terminated polymer of the formula,

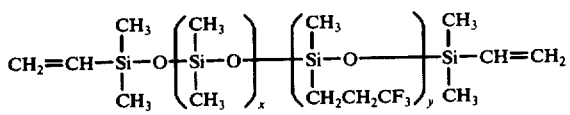

The above polymer had a viscosity of 40,000 centipoise at 25° C and the value of $y$ is such that the concentration of methyltrifluoropropyl siloxy units was 37 mole percent, and the value if $x$ equals the concentration of dimethylsiloxy units. To this polymer there was added 25 parts of a resin composed of $(CH_3)_3SiO_{0.5}$ units $Vi(CH_3)_2SiO_{0.5}$ units, $SiO_2$ units and $XCH_3(CF_3CH_2CH_2)SiO$ units where the hydrocarbon substituent group to Si ratio was 1.4 and where the concentration of methyltrifluoropropylsiloxy units in the entire resin was 21 mole percent. The resin had a silanol content of <0.1% by weight. The resin was incorporated into the vinyl-terminated polymer by dissolving it in butyl acetate and then the butyl acetate was stripped off at 127° C under vacuum. To the resulting mixture there was then added 15 parts per million of platinum as a platinum complex of platinum with a vinyl polysiloxane. To 100 parts of this mixture there was then added the parts indicated below in the table of a hydride cross-linker which in this case was a resin composed of $H(CH_3)_2SiO_{0.5}$ units and $SiO_2$ units where the $CH_3 + H$ to Si ratio was 2, and where the hydride concentration was 0.9 weight percent hydrogen. The resulting resin polymer blend with the hydride cross-linker had a viscosity of 25,000 centipoise at 25° C and specific gravity of 1.31. The resulting composition with the various parts of hydride cross-linker in its had a room temperature work life of 3 hours time and when heat cured one hour at 100° C had the following physical properties shown in the table below:

TABLE 1

| Physical Properties | Concentration of Hydride Cross-Linking Resin per 100 Parts of Component A | | |
|---|---|---|---|
| | 1.0 Pts. | 1.5 Pts. | 2.5 Pts. |
| Tensile Strength, psi | 330 | 350 | 457 |
| % Elongation | 170 | 160 | 210 |
| Shore A | 40 | 50 | 45 |
| Tear Strength, pi | 26 | 36 | 49 |
| 100% Modulus#/psi | 152 | 251 | 191 |

EXAMPLE 2

There was first prepared a first component (Component A) composed of 75 parts of a vinyl-terminated polymer of the formula,

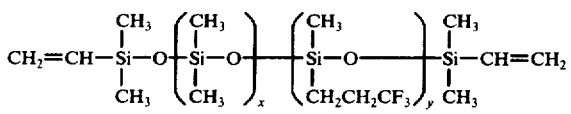

where the viscosity of the polymer was 40,000 centipoise at 25° C and such that the value of y is equal to a 37 mole percent concentration of methyltrifluoropropylsiloxy units and the value of x equals the concentration of dimethylsiloxy units. To this vinyl-terminated polymer there was added 25 parts of a resin composed of $(CH_3)_3SiO_{0.5}$ units, $Vi(CH_3)_2SiO_{0.5}$ units, $SiO_2$ units and $CH_3(CF_3CH_2CH_2)SiO$ units, where the hydrocarbon substituent to Si ratio was 1.4 where the resin contains 21 mole percent of methyltrifluoropropylsiloxy units and has a silanol content of 0.1% by weight. To this mixture, after the resin was dispersed in the vinyl containing polymer, was added 15 parts per million in terms of platinum of a platinum complex which was formed by complexing platinum with a vinyl polysiloxane. There was then added to Component A, 40 parts of 10 micron alpha quartz and 0.5 parts of red iron oxide. This mixture forms Component A.

There was then formed the second component, Component B, composed of 18 parts of a hydride containing polysiloxane of the formula,

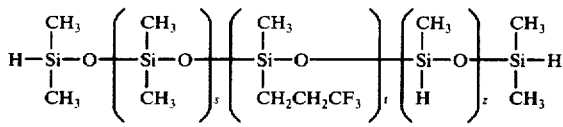

where the polymer had a viscosity of 300 centipoise at 25° C and such that the value of t had a 50 mole percent concentration of methyltrifluoropropylsiloxy units in the polymer. The polymer also had a hydride concentration of 0.84% by weight. To the hydride polysiloxane there was added 55.5 parts of the vinyl-terminated polymer in Component A and 26.5 parts of 10 micron alpha quartz, 1 part of Component B was mixed with 10 parts of Component A to yield the composition having a viscosity of 60,000 centipoise at 25° C in the uncured state, of specific gravity of 1.54 and a room temperature work life of 3 hours.

The cured elastomer had the following physical properties:

| Tensile strength, psi | 450 |
|---|---|
| % Elongation | 70 |
| Shore A | 60 |
| Tear, pi | 45 |

The cured elastomer when tested in 24 hours in toluene had a percent volume swell of 32.4% and when tested for 24 hours in jet fuel had a 22.2% volume swell.

A typical methyl substituent SiH-olefin RTV compound such as that disclosed in Modic, U.S. Pat. No. 3,425,967, had the following solvent resistance in the cured state which are given below for comparison purposes:

24 hours in toluene — % Volume swell 89%

24 hours in jet fuel — % Volume swell 88%

As can be seen from the above results, the SiH-olefin RTV compounds of the present case have good physical properties and exceptionally high solvent resistance to hydrocarbon fluids as compared to the prior art SiH-olefin platinum catalyzed compositions.

I claim:

1. A solvent resistant room temperature vulcanizable silicone rubber composition comprising (A) 100 parts of a mixture composed of (i) 100 parts of a vinyl-containing polymer of the formula,

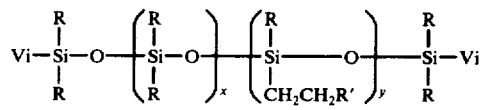

wherein Vi is vinyl, R is selected from the class consisting of alkyl radicals of 1 to 8 carbon atoms and phenyl, R' is perfluoroalkyl of 1 to 8 carbon atoms, x and y are at least 1, and the viscosity of the compound varies from 1,000 to 100,000 centipoise at 25° C, and the concentration of siloxy units taken y times varies from 5 to 98 mole percent; (ii) from 1 to 60 parts of a vinyl-containing resin selected from the class consisting of a resin having $ViRR''SiO_{0.5}$ units and $SiO_2$ units where the hydrocarbon substituent to Si ratio varies from 0.8 to 2.7; a resin having $ViRR''SiO_{0.5}$ units, $SiO_2$ units and $RR''SiO$ units where the hydrocarbon substituent to Si ratio varies from 0.8 to 2.4 and a resin having $ViR_2SiO_{0.5}$ units, $R_2R''SiO_{0.5}$ units, $SiO_2$ units and $RR''SiO$ units where the hydrocarbon substituent to Si ratio varies from 0.8 to 2.4; a resin having $ViR_2SiO_{0.5}$ units, $R_2R''SiO_{0.5}$ units, $SiO_2$ units, $ViR''SiO$ units and $RR''SiO$ units where the hydrocarbon substituent to Si ratio varies from 0.8 to 2.4 and a resin having a $R_2R''SiO_5$ units, $SiO_2$ units and $ViR''SiO$ units where the hydrocarbon substituent to Si ratio varies from 0.8 to 2.4 where Vi and R are as previously defined, R" is an $—CH_2CH_2R''$ radical, where R' is as previously defined and the vinyl concentration of said resin must not differ more than 20 mole percent from the vinyl concentration of polymer (i); (iii) from 0.1 to 50 parts per million of the total composition of a platinum catalyst; and (B) from 1 to 50 parts based on 100 parts of the mixture (A) of a cross-linking polymer selected from the class consisting of (iv) a resin having

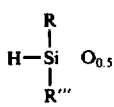

units and $SiO_2$ units where the $R + H + R'''$ to Si ratio varies from 1.0 to 2.71; (v) a resin having

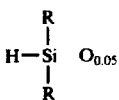

units, $SiO_2$ units and $RR'''SiO$ units where the $H + R + R'''$ to Si ratio varies from 1.2 to 2.7 and (vi) a polymer of the formula,

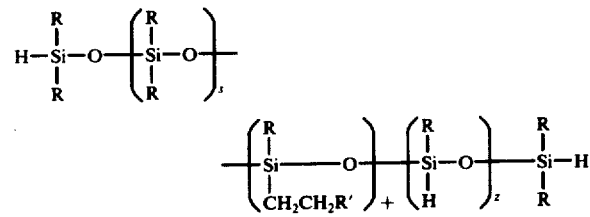

and mixtures thereof and where the concentration of the units taken $t$ times varies from 0 to 75 mole percent, where R,R' are as previously defined, $s$ is at least $l$, $t$ and $z$ may be zero or a positive integer and the viscosity of the polymer varies from 10 to 1,000 centipoise at 25° C, and R''' is selected from the class consisting of alkyl radicals of 1 to 8 carbon atoms and $-CH_2CH_2R'$ radicals.

2. The composition of claim 1 wherein there is present in (A) from 5 to 100 parts of a filler which is selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

3. The composition of claim 1 wherein there is present in (A) from 5 to 100 parts of a filler which is selected from the class consisting of fumed silica and precipitated silica which has been treated with a silicone compound.

4. The composition of claim 1 where R is methyl and R' is $CF_3$.

5. The composition of claim 3 where the silicone compound is a silazane.

6. The composition of claim 1 wherein in (A) there is present from 0.1 to 5 parts of iron oxide.

7. The composition of claim 1 wherein the platinum catalyst is platinum complexed with a vinyl-containing polysiloxane.

8. The composition of claim 1 wherein there is present in the total composition from 100 to 10,000 parts per million of a cure inhibitor which is an alkenyl-containing cyclicpolysiloxane.

9. The composition of claim 1 wherein the concentration of the units taken y times in polymer (i) varies from 30 to 98 mole percent and the concentration of the units taken t times in polymer (vi) varies from 25 to 75 mole percent.

10. A process for forming a solvent resistant silicone elastomer comprising (a) mixing (A) 100 parts of a mixture composed of (i) 100 parts of a vinyl-containing polymer of the formula,

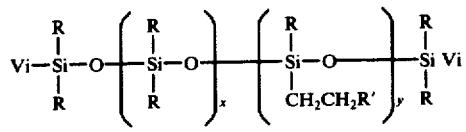

where Vi is vinyl, R is selected from the class consisting of alkyl radicals of 1 to 8 carbon atoms and phenyl, R' is perfluoroalkyl of 1 to 8 carbon atoms, $x$ and $y$ are at least 1 and the viscosity of the compound varies from 1,000 to 100,000 centipoise at 25° C, and the concentration of silioxy units taken $y$ times varies from 5 to 98 mole percent; (ii) from 1 to 60 parts of vinyl-containing resin selected from the class consisting of a resin having $ViRR''SiO_{0.5}$ units and $SiO_2$ units where the hydrocarbon substituent to Si ratio varies from 0.8 to 2.7; a resin having $ViRR''SiO_{0.5}$ units, $SiO_2$ units, and $RR''SiO$ units where the hydrocarbon sutstituent to Si ratio varies from 0.8 to 2.4; a resin having $ViR_2SiO_{0.5}$ units, $R_2R''SiO_{0.5}$ units, $SiO_2$ units and $RR''SiO$ units where the hydrocarbon substituent to Si ratio varies from 0.8 to 2.7; a resin having $ViR_2SiO_{0.5}$ units, $R_2R''SiO_{0.5}$ units, $SiO_2$ units, $ViR''SiO$ units and $RR''SiO$ units where the hydrocarbon substituent to Si ratio varies from 0.8 to 2.4, and a resin having $R_2R''SiO_{0.5}$ units, $SiO_5$ units, and $ViR''SiO$ units where the hydrocarbon substituent to Si ratio caries from 0.8 to 2.4 where R, Vi and R' are as previously defined, R'' is an $-CH_2CH_2R'$ radical where R' is as previously defined and the vinyl concentration of said resin must not differ more than 20 mole percent from the vinyl concentration of polymer (i); (iii) from 0.1 to 50 parts per million of the total composition of a platinum catalyst; with (B) from 1 to 50 parts based on 100 parts of the mixture (A) of a cross-linking polymer selected from the class consisting of (iv) a resin having

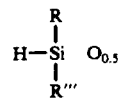

units and $SiO_2$ units where the $R + R''' + H$ to Si ratio varies from 1.0 to 2.7; (v) a resin having

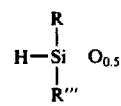

units, $SiO_2$ units and $RR'''SiO$ units where the $R + R''' + H$ to Si ratio varies from 1.2 to 2.7 and (vi) a polymer of the formula,

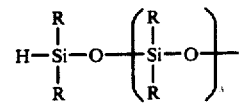

-continued

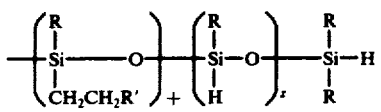

and mixtures thereof and where the concentration of the units, taken $t$ times varies from 0 to 75 mole percent where R, R' are as previously defined, $s$ is at least $l$, $t$ and $z$ may be zero or a positive integer and the viscosity of the polymer varies from 10 to 1,000 centipoise at 25° C and R''' is selected from the class consisting of alkyl radicals of 1 to 8 carbon atoms and —CH$_2$CH$_2$R' radicals, and (b) allowing the mixture to cure.

11. The process of claim 10 wherein there is present in (A) from 5 to 100 parts of a filler which is selected from the class consisting of titanium dioxide, lithopone, zince oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calined clay, asbestos, carbon, graphite, cork, cotton and synthetic fibers.

12. The process of claim 10 wherein there is present in (A) from 5 to 100 parts of a filler which is selected from the class consisting of fumed silica and precipitated silica which has been treated with a silicone compound.

13. The process of claim 10 wherein R is methyl and R' is CF$_3$.

14. The process of claim 12 wherein the silicone compound is silazane.

15. The process of claim 10 wherein in (A) there is present from 0.1 to 5 parts of iron oxide.

16. The process of claim 10 wherein the platinum catalyst is platinum complexed with a vinyl-containing polysiloxane.

17. The process of claim 10 where there is present in the total composition from 100 to 10,000 parts per million of a cure inhibitor which is an alkenyl-containing cyclicpolysiloxane.

18. The process of claim 10 wherein the concentration of the units taken $y$ times in polymer (i) varies from 30 to 98 mole percent and the concentration of the units taken $t$ times in polymer (vi) varies from 35 to 75 mole percent.

* * * * *